US012770287B2

(12) United States Patent
Liu et al.

(10) Patent No.: US 12,770,287 B2

(45) Date of Patent: Oct. 20, 2026

(54) THREE-DIMENSIONAL TARGET DETECTION METHOD BASED ON MULTIMODAL FUSION AND DEPTH ATTENTION MECHANISM

(71) Applicant: CHANG'AN UNIVERSITY, Xi'an (CN)

(72) Inventors: Zhanwen Liu, Xi'an (CN); Yang Wang, Xi'an (CN); Xing Fan, Xi'an (CN); Shan Lin, Xi'an (CN); Juanru Cheng, Xi'an (CN); Yuande Jiang, Xi'an (CN); Chao Li, Xi'an (CN); Bolin Gao, Xi'an (CN); Yi He, Xi'an (CN); Jin Fan, Xi'an (CN); Nan Yang, Xi'an (CN)

(73) Assignee: CHANG'AN UNIVERSITY, Xi'an (CN)

(*) Notice: Subject to any disclaimer, the term of this patent is extended or adjusted under 35 U.S.C. 154(b) by 202 days.

(21) Appl. No.: 18/911,890

(22) Filed: Oct. 10, 2024

(65) Prior Publication Data

US 2025/0037299 A1 Jan. 30, 2025

Related U.S. Application Data

(63) Continuation-in-part of application No. PCT/CN2024/075385, filed on Feb. 2, 2024.

(30) Foreign Application Priority Data

Apr. 21, 2023 (CN) ......................... 202310438843.9

(51) Int. Cl.

*G06T 7/70* (2017.01)
*G06T 7/11* (2017.01)

(52) U.S. Cl.

CPC .................. *G06T 7/70* (2017.01); *G06T 7/11* (2017.01); *G06T 2207/10028* (2013.01); *G06T 2207/20081* (2013.01)

(58) Field of Classification Search

None

See application file for complete search history.

(56) References Cited

U.S. PATENT DOCUMENTS

| | | | | |
|---|---|---|---|---|
| 11,100,669 | B1 * | 8/2021 | Zhou | G01S 13/867 |
| 12,546,882 | B2 * | 2/2026 | Hwang | G01S 13/867 |

(Continued)

*Primary Examiner* — Leon Flores

(74) *Attorney, Agent, or Firm* — Carter, DeLuca & Farrell, LLP

(57) ABSTRACT

A 3D target detection method based on multimodal fusion and a depth attention mechanism includes the following steps: obtaining and preprocessing original point cloud data and original image data; inputting the preprocessed point cloud data and image data into a 3D target detection network based on multimodal fusion and the depth attention mechanism, where the 3D target detection network based on multimodal fusion and the depth attention mechanism includes a generation phase for 3D bounding box proposals and a refinement phase for 3D bounding boxes, and the network outputs parameters and classification confidence of a target bounding box; training the 3D target detection network based on multimodal fusion and the depth attention mechanism; and processing the collected lidar point cloud data and image data by using the trained detection network, and outputting 3D target information, to realize 3D target detection.

8 Claims, 8 Drawing Sheets

(56) References Cited

U.S. PATENT DOCUMENTS

| | | | | |
|---|---|---|---|---|
| 2020/0160559 | A1* | 5/2020 | Urtasun | G06N 3/084 |
| 2022/0101555 | A1* | 3/2022 | Zhang | G06T 7/11 |
| 2022/0270327 | A1* | 8/2022 | Sivakumar | G06V 40/103 |
| 2023/0154170 | A1* | 5/2023 | Wang | G06V 10/806<br>382/190 |
| 2024/0153249 | A1* | 5/2024 | Borse | G06V 10/803 |

* cited by examiner

THREE-DIMENSIONAL TARGET DETECTION METHOD BASED ON MULTIMODAL FUSION AND DEPTH ATTENTION MECHANISM

CROSS REFERENCE TO RELATED APPLICATION

The present application is a continuation-in-part of International Patent Application No. PCT/CN2024/075385, filed on Feb. 2, 2024, which claims priority to Chinese Patent Application No. CN202310438843.9 filed with the China National Intellectual Property Administration (CNIPA) on Apr. 21, 2023 and entitled "THREE-DIMENSIONAL TARGET DETECTION METHOD BASED ON MULTIMODAL FUSION AND DEPTH ATTENTION MECHANISM", the entire contents of each of which are incorporated herein by reference.

TECHNICAL FIELD

The present disclosure relates to the technical field of automatic driving, and in particular to a three-dimensional (3D) target detection method based on multimodal fusion and a depth attention mechanism.

BACKGROUND

Self-driving and networked vehicles play a crucial role in the future development of road traffic and transportation. To navigate complex traffic environments quickly and safely, networked vehicles rely on sensors such as cameras and lidars to achieve high-precision environmental perception through multimodal fusion algorithms. However, lidar point clouds are sparse and continuous, whereas cameras capture dense features in discrete states, resulting in different data formats. Therefore, effectively integrating 2D images into a 3D inspection pipeline remains a significant challenge.

The performance of previous single-modal detection methods is often constrained by inherent sensor characteristics such as image data occlusion and overexposure. Lidar point clouds typically exhibit sparse, disordered, and uneven distribution, leading to unstable data quality that can impact target detection accuracy. To leverage the complementary advantages of multi-sensors for accurate and robust 3D target detection, one approach is to utilize mature 2D detectors to generate initial bounding box proposals in the form of a view frustum. However, this fusion approach often results in coarse granularity, thus limiting the full potential of both modalities. Moreover, the cascade methods require additional 2D annotations and are restricted by the performance of 2D detectors. Notably, if an object is missed during 2D detection, it will also be missed in the subsequent 3D detection pipeline. The other approach adopts a more 3D-focused method, connecting features from the 2D image convolution network with 3D voxel or point features to enhance the richness of 3D features. However, the performance of this method is constrained by the quantization of point clouds, as fine-grained point-level information may be lost during data transformation. This method achieves multimodal fusion at the feature level. The challenge lies in the sparse and continuous nature of lidar point clouds contrasted with the camera's capture of dense features in discrete states. Effectively integrating the features remains an urgent problem to solve.

SUMMARY

The present disclosure provides a 3D target detection method based on multimodal fusion and a depth attention mechanism, to address the issue that existing models overlook the quality of real data and the contextual relationships between two modalities. This oversight often results in degraded performance when image features or point cloud features are flawed.

To achieve the above objective, the present disclosure adopts the following technical solutions:

A 3D target detection method based on multimodal fusion and a depth attention mechanism specifically includes the following steps:

step 1: obtaining original point cloud data and original image data, where the original point cloud data includes spatial coordinate information (x, y, z) and the original image data includes red, green, blue (RGB) information; and then preprocessing the obtained original point cloud data and original image data to obtain preprocessed point cloud data and image data;

step 2: inputting the preprocessed point cloud data and image data into a 3D target detection network based on multimodal fusion and the depth attention mechanism, where the 3D target detection network based on multimodal fusion and the depth attention mechanism includes two phases: the first is a generation phase for 3D bounding box proposals, and the second is a refinement phase for 3D bounding boxes, and the 3D target detection network finally outputs parameters and classification confidence of a target bounding box, where step 2.1: the generation phase for 3D bounding box proposals, specifically including:

inputting the preprocessed point cloud data and image data into the generation phase for 3D bounding box proposals, where in said phase, the input data is first input into a multi-scale feature fusion backbone network for multimodal feature fusion, to output fusion features; then the fusion features are used for bin-based 3D bounding box generation, to generate the 3D bounding box proposals using foreground points, and a plurality of 3D bounding box proposals are selected as output by using a non-maximum suppression (NMS) algorithm;

the multi-scale feature fusion backbone network includes four submodules: a lidar point cloud feature extraction module, an image feature extraction module, an adaptive threshold generation module, and fusion modules based on the depth attention mechanism;

a data flow direction in the multi-scale feature fusion backbone network is as follows: the preprocessed point cloud data is input into the lidar point cloud feature extraction module to output point cloud features at five different scales; simultaneously, the preprocessed point cloud data is input into the adaptive threshold generation module to output a depth threshold; the preprocessed image data is input into the image feature extraction module to output image features at five different scales; a fusion module based on the depth attention mechanism is built between point cloud features and image features at a consistent scale, to perform multimodal feature fusion, and there are five scale-corresponding fusion modules based on the depth attention mechanism; input of each fusion module based on the depth attention mechanism includes the point cloud features and image features at the same scale obtained through the lidar point cloud feature extraction module and the image feature extraction module, the preprocessed point cloud data, and the depth threshold obtained through the adaptive threshold generation module, and output of each fusion module is multimodal fusion features;

the output of the first four fusion modules based on the depth attention mechanism is sent back to scale-corresponding feature extraction layers in the lidar point cloud feature extraction module, and further encoded through a lidar feature extraction process, and the fusion features output by the last fusion module based on the depth attention mechanism are taken as output of the whole multi-scale feature fusion backbone network; and the fusion features obtained through the multi-scale feature fusion backbone network are used for bin-based 3D bounding box generation, to generate the 3D bounding box proposals using the foreground points, and the plurality of 3D bounding box proposals are selected as the output; and step 2.2: the refinement phase for 3D bounding boxes, including: inputting the 3D bounding box proposals, the fusion features, and foreground masks obtained in the step 2.1 into the refinement phase for 3D bounding boxes, performing refinement correction and classification confidence estimation for the 3D bounding boxes, and finally outputting the parameters and classification confidence for the target bounding box;

step 3: training the 3D target detection network based on multimodal fusion and the depth attention mechanism; and step 4: processing the collected and to-be-detected lidar point cloud data and image data by using the trained 3D target detection network based on multimodal fusion and the depth attention mechanism, and outputting 3D target information including the parameters and classification confidence of the 3D target bounding box, to realize 3D target detection.

Further, in the step 1, the original point cloud data and the original image data may be obtained from a KITTI data set.

Further, in the step 2.1, the input of the lidar point cloud feature extraction module is the preprocessed lidar point cloud data, and the point cloud features at different scales are output. Specifically, four set abstraction (SA) layers are built for down-sampling of the point cloud features, and then four feature propagation (FP) layers are used for up-sampling of the point cloud features.

Further, in the step 2.1, the input of the image feature extraction module is the preprocessed image data, and the image features at different scales are output. Specifically, four convolution blocks are built to match resolutions of the point cloud features, each convolution block includes a batch normalization (BN) layer, a rectified linear unit (ReLU) activation function, and two convolution layers, and a stride of the second convolution layer is set to 2 for down-sampling of the image features, and transposed convolution is used for up-sampling of the image features with four different resolutions.

Further, in the step 2.1, the adaptive threshold generation module treats each point of the preprocessed lidar point cloud data as a center point to calculate a density, including: first dividing the preprocessed point cloud data into spherical neighborhoods with the center point as a centroid, then calculating a quantity of point clouds within each neighborhood, and dividing the quantity by a neighborhood volume, to obtain volume densities of different regions of the point cloud, encoding the density information through a multilayer perceptron (MLP), normalizing output of the MLP to a range of [0, 1] using a sigmoid activation function, and finally outputting the depth threshold.

Further, in the step 2.1, the fusion module based on the depth attention mechanism specifically performs the following steps:

generating pointwise image feature representations by using the preprocessed point cloud data and the scale-corresponding image features obtained through the image feature extraction module;

inputting the pointwise image feature, the point cloud feature, and the preprocessed point cloud data at the same scale into a gated weight generation network, including: inputting the preprocessed point cloud data $F_{oL}$ into three fully connected layers, separately inputting the pointwise image feature $F_I$ and the point cloud feature $F_L$ into a fully connected layer, then adding three results with a same channel size to generate two branches through a tanh function, compressing the two branches into single-channel weight matrices through two fully connected layers; normalizing the two weight matrices to a range of [0, 1] by using the sigmoid activation function, multiplying the two weight matrices with the pointwise image feature and the point cloud feature respectively to generate a gated image feature $F_{g.I}$ and a gated lidar point cloud feature $F_{g.L}$; and inputting the generated gated image feature $F_{g.I}$ and gated lidar point cloud feature $F_{g.L}$ into a depth selection network, including: dividing the scale-corresponding point cloud data into a short-distance point set and a long-distance point set according to the depth threshold generated by the adaptive threshold generation module; in the short-distance point set, concatenating the point cloud feature $F_L$ and the gated image feature $F_{g.I}$ in a feature dimension; in the long-distance point set, concatenating the pointwise image feature $F_I$ and the gated lidar point cloud feature $F_{g.L}$ in the feature dimension; and fusing multimodal features across the point sets through index connections, where the depth selection network finally outputs the multimodal fusion features.

Further, in the step 2.1, the fusion features obtained through the multi-scale feature fusion backbone network are used for bin-based 3D bounding box generation, to generate the 3D bounding box proposals using the foreground points, and the plurality of 3D bounding box proposals are selected as the output, specifically including:

inputting the multimodal fusion features $F_{fu}$ obtained through the multi-scale feature fusion backbone network into a one-dimensional convolution layer to generate classification scores for point clouds corresponding to the fusion features, and a point with a classification score greater than 0.2 is considered as a foreground point, otherwise, the point is considered as a background point, that is, a foreground mask is obtained; then generating the target 3D bounding box proposals using the foreground points through the bin-based 3D bounding box generation method, and selecting 512 3D bounding box proposals as the output by using the NMS algorithm.

Further, in the step 3, a total loss is a sum of a loss $L_{rpn}$ in the generation phase for 3D bounding box proposals and a loss $L_{renn}$ in the refinement phase for 3D bounding boxes.

The present disclosure has following beneficial effects:

By extracting point cloud and image features at different scales and employing a depth attention mechanism for fusion across multiple scales, the present disclosure fully and effectively utilizes the point cloud and image features. In addition, the adaptive threshold generation network dynamically generates the depth threshold in a learnable manner, guiding the fusion process effectively and achieving high-precision environmental perception.

BRIEF DESCRIPTION OF THE DRAWINGS

In FIG. 2, A1—Point cloud density extraction, A2—Depth threshold, A3—Fusion module, A4—Fusion module, A5—Fusion module, A6—Fusion module, A7—Fusion module, A8—N'×1, A9-N×1; A10—Foreground mask; A10—3D region of interest; A11—Point cloud encoding In FIG. 3, B1—Point cloud density extraction; B2—Adaptive threshold generation; B3—Depth threshold; B4—Depth threshold; B5—2D convolution; B6—2D convolution; B7—2D convolution; B8—2D convolution; B9—3D bounding box proposal generation; B10—3D bounding box refinement; B11—Multi-layer MLP; B12—Set abstraction; B13—N'×1, B14—N×1.

DETAILED DESCRIPTION

The present disclosure is described in more detail hereinafter with reference to the accompanying drawings and specific embodiments.

A term used in the present disclosure is first explained:

The KITTI data set is an open data set for evaluating computer vision algorithms in autonomous driving scenes.

Figure 1:
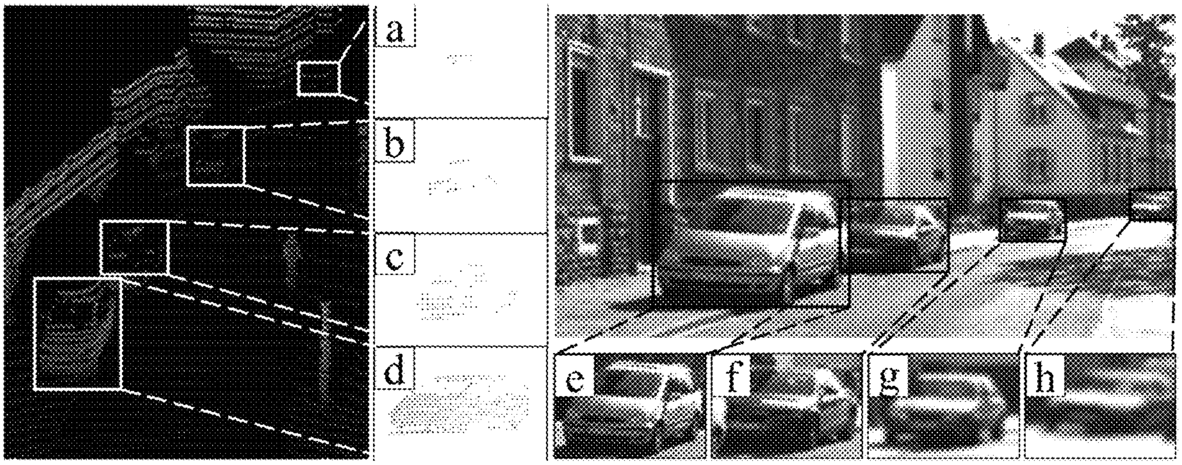
FIG. 1 is a schematic diagram of images and lidar representation information at different depths.

According to the present disclosure, it has been observed that the complementary relationship between point s and images varies with depth. As shown in FIG. 1, the left half shows representations of the target at different depths in laser radar point cloud data, and the right half shows representations of the target at different depths in image data. Point cloud data undergoes significant changes in appearance with increasing distance from the lidar sensor, whereas the edge, color, and texture information of images are less affected by depth changes. In FIG. 1, d and e show representations of the same target in different sensor data at close range. In this case, it can be observed that the dense point cloud data preserves complete target structure information, leveraging natural spatial advantages in the 3D world to dominate fusion processes. Conversely, a and h in FIG. 1 show representations of the same target at a greater distance. It can be observed that in the point cloud data, there are too few point clouds covering the target, resulting in the loss of spatial structure information. However, in the image data, the appearance information of the target is well retained. In this case, dense and consistent semantic information from images aids target identification, while depth information from lidar point cloud data assists in target positioning.

The present disclosure provides a 3D target detection method based on multimodal fusion and a depth attention mechanism, specifically includes the following steps:

In step 1, original point cloud data and original image data are obtained from the KITTI data set. The original point cloud data includes spatial coordinate information (x, y, z) and the original image data includes RGB information. Then the obtained original point cloud data and original image data are preprocessed to obtain preprocessed point cloud data and image data. Specifically, the preprocessing includes rotating, flipping, scale transformation, and size normalization on the original point cloud data and the original image data. In the present disclosure, the image size is unified as 1280×384, and the quantity of laser radar point clouds is unified as 16384.

Figure 2:
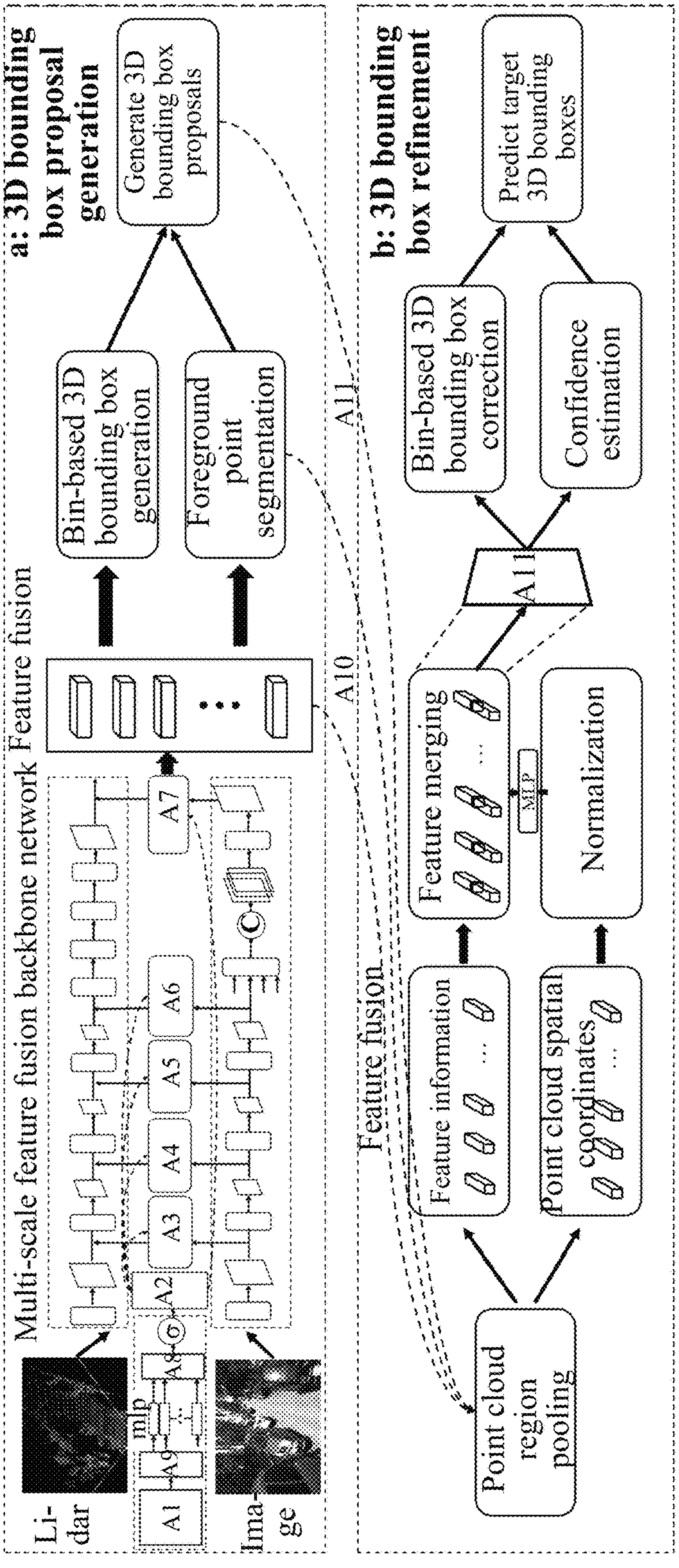
FIG. 2 is a diagram of an overall architecture of a 3D target detection network based on multimodal fusion and a depth attention mechanism.

In step 2, the preprocessed point cloud data and image data are input into a 3D target detection network based on multimodal fusion and the depth attention mechanism in FIG. 2. The network is a 3D target detection network including two phases: the first is a generation phase for 3D bounding box proposals as shown in FIG. 2(*a*), and the second is a refinement phase for 3D bounding boxes as shown in FIG. 2(*b*). The network finally outputs parameters and classification confidence of a target bounding box, to realize precise 3D target detection.

In step 2.1, as shown in the generation phase for 3D bounding box proposals in FIG. 2(*a*), the preprocessed point cloud data and image data are input into the generation phase for 3D bounding box proposals. In the phase, the input data is first input into a multi-scale feature fusion backbone network for multimodal feature fusion, to output fusion features; then the fusion features are used for bin-based 3D bounding box generation, to generate the 3D bounding box proposals using foreground points, and 512 3D bounding box proposals are selected as output by using an NMS algorithm.

Figure 3:
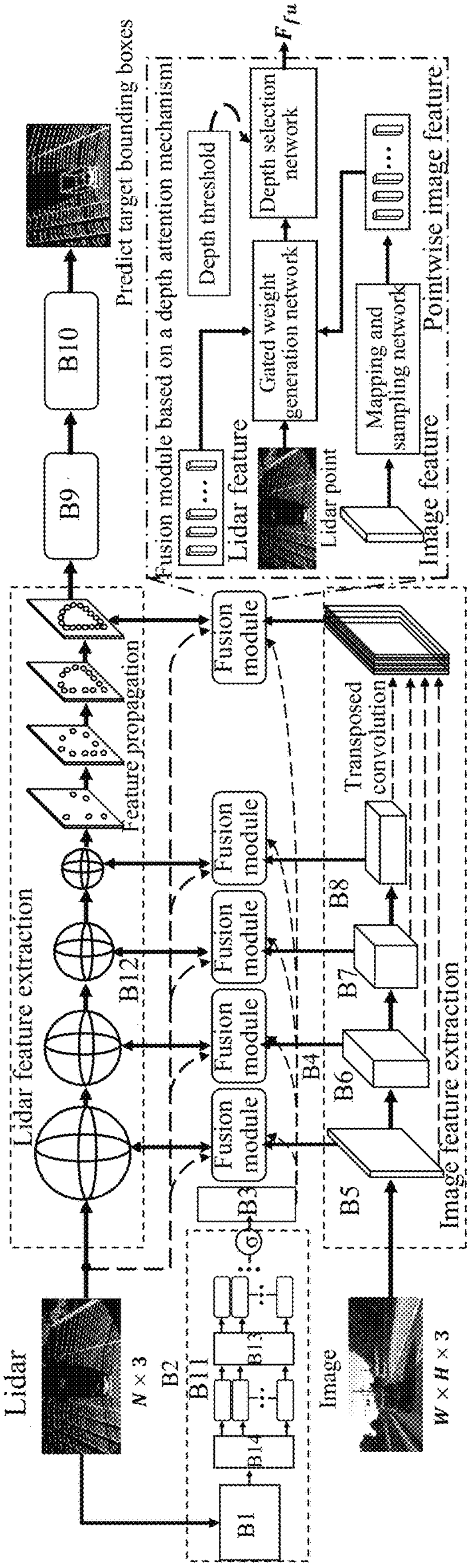
FIG. 3 is a diagram of an overall architecture of a multi-scale feature fusion backbone network.

The structure of the multi-scale feature fusion backbone network is as shown in FIG. 3, including four submodules: a lidar point cloud feature extraction module, an image feature extraction module, an adaptive threshold generation module, and fusion modules based on the depth attention mechanism.

As shown in FIG. 3, a data flow direction in the multi-scale feature fusion backbone network is as follows: the preprocessed point cloud data is input into the lidar point cloud feature extraction module to output point cloud features at five different scales; simultaneously, the preprocessed point cloud data is input into the adaptive threshold generation module to output a depth threshold; and the preprocessed image data is input into the image feature extraction module to output image features at five different scales. A fusion module based on the depth attention mechanism is built between point cloud features and image features at a consistent scale, to perform multimodal feature fusion, and there are five scale-corresponding fusion modules based on the depth attention mechanism. Input of each fusion module based on the depth attention mechanism includes the point cloud features and image features at the same scale obtained through the lidar point cloud feature extraction module and the image feature extraction module, the preprocessed point cloud data, and the depth threshold obtained through the adaptive threshold generation module, and output of each fusion module is multimodal fusion features. The fusion features are sent back to scale-corresponding feature extraction layers in the lidar point cloud feature extraction module, and are further encoded through a lidar feature extraction process.

Figure 4:
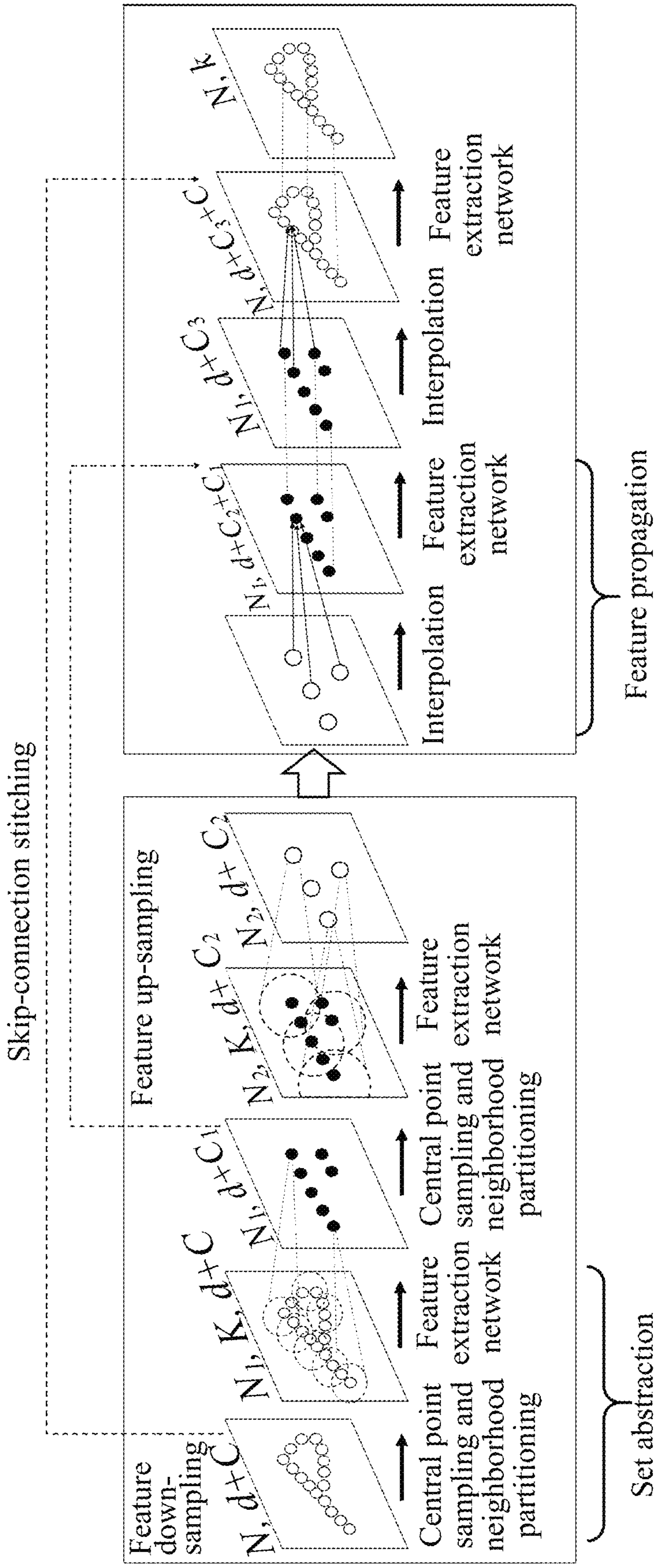
FIG. 4 is an architecture diagram of a point cloud feature extraction network based on hierarchical partitioning and local abstraction.

The four submodules of the multi-scale feature fusion backbone network have the following structure:

The lidar point cloud feature extraction module: As shown in a lidar feature extraction section in FIG. 3, the input of the module is the preprocessed lidar point cloud data, and the output is the point cloud features at different scales. Specifically, in the present disclosure, four SA layers are constructed for down-sampling of the point cloud features, with sampling point quantities of 4096, 1024, 256, and 64 respectively. To ensure a complete feature representation for each point, four FP layers are used for up-sampling of the point cloud features. Both the SA and FP layers originate from the point cloud feature extraction section based on hierarchical partitioning and local abstraction in the PointNet++ network shown in FIG. 4.

The image feature extraction module: As shown in an image feature extraction section in FIG. 3, the input of the module is the preprocessed image data, and the output is the image features at different scales. Specifically, in the present disclosure, four convolution blocks are constructed to match resolutions of the point cloud features. Each convolution block includes a BN layer, a ReLU activation function, and two convolution layers. The stride of the second convolution layer is set to 2 for down-sampling of the image features. Then, transposed convolution is used to realize up-sampling of the image features with four different resolutions.

The adaptive threshold generation module: As shown in an adaptive threshold generation section in FIG. 3, each point of the preprocessed lidar point cloud is taken as a center point to calculate the density in the present disclosure. First, the preprocessed point cloud data is divided into spherical neighborhoods with the center point as a centroid, then a quantity of point clouds within each neighborhood is calculated, and the quantity is divided by a neighborhood volume, to obtain volume densities of different regions of the point cloud, the density information is encoded through a MLP, output of the MLP is normalized to a range of [0, 1] using a sigmoid activation function, and finally the depth threshold is output.

Figure 5:
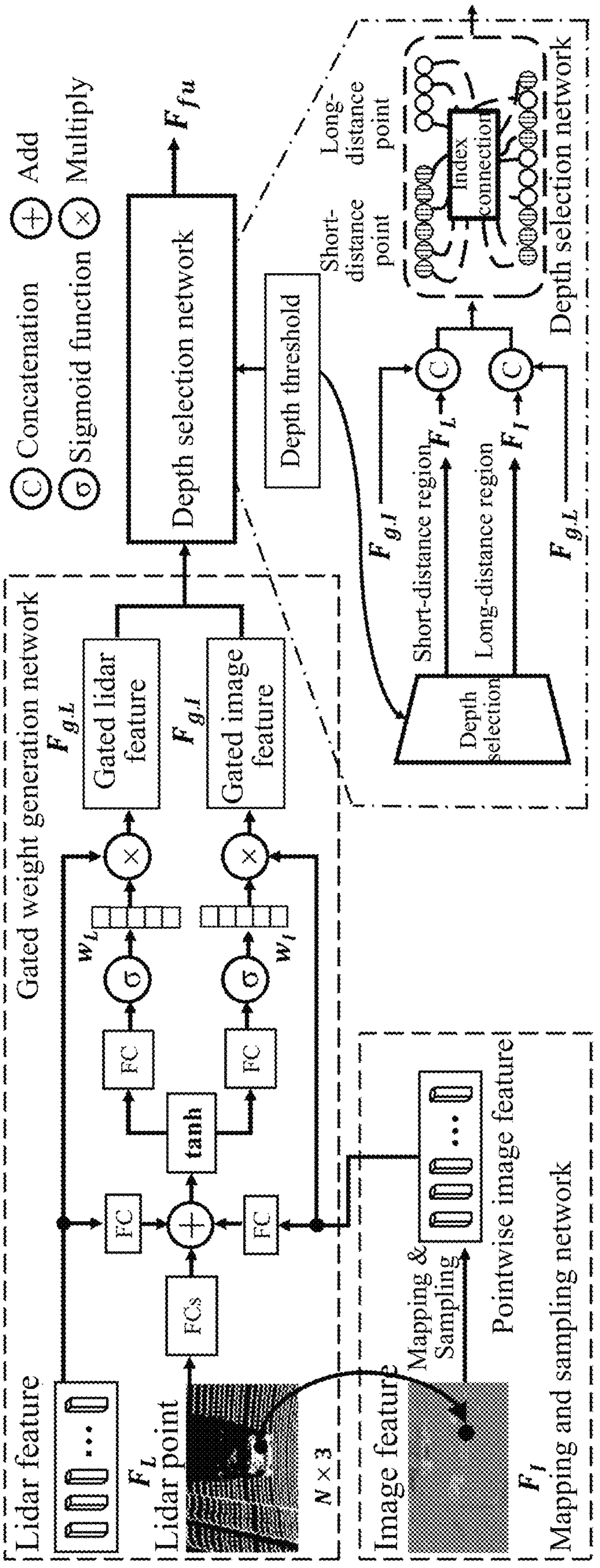
FIG. 5 is a diagram of a fusion module based on a depth attention mechanism.
Figure 6:
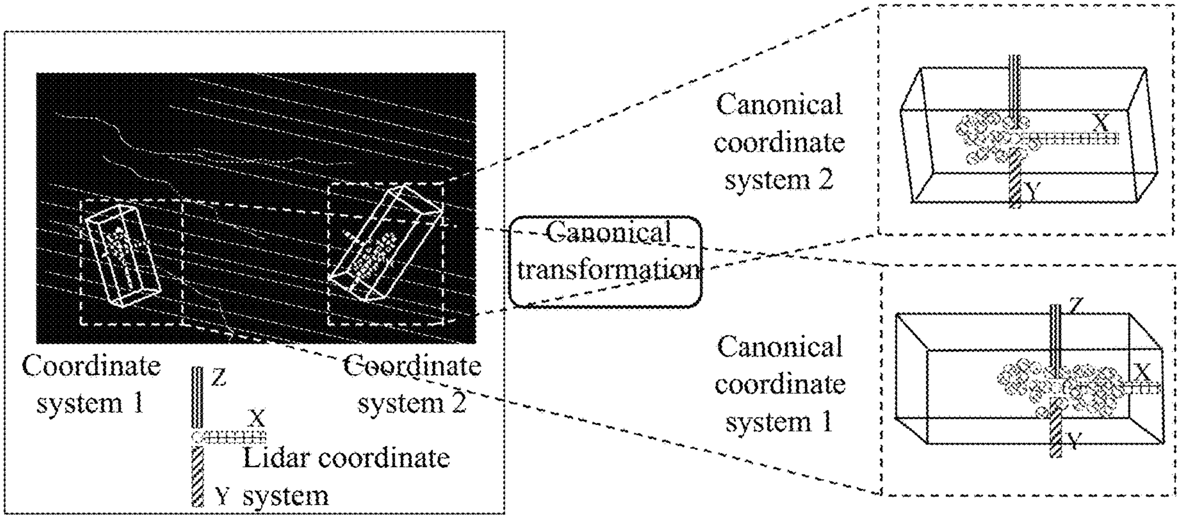
FIG. 6 is a schematic diagram of transformation to a canonical coordinate system.

The fusion module based on the depth attention mechanism: As shown in FIG. 5, the input of the module includes the point cloud features and image features at the same scale obtained through the lidar point cloud feature extraction module and the image feature extraction module, the preprocessed point cloud data, and the depth threshold obtained through the adaptive threshold generation module, and the output is corresponding multimodal fusion features. The specific process is as follows:

① Pointwise image feature representations are generated by using the preprocessed point cloud data and the scale-corresponding image features obtained through the image feature extraction module. As shown in the mapping sampling network in FIG. 6, the point-to-pixel correspondence is realized through projection and calibration matrix, that is, the projection position $\tilde{P}_i$ ($x_i$, $y_i$) of each point $P_i$ ($x_i$, $y_i$, $z_i$) of the point cloud to the image plane is calculated.

$$\tilde{P}_i = R_{in} \times R_{rect} \times T_{velo\_to\_cam} \times P_i.$$

$R_{in}$ is the intrinsic matrix of the camera, $R_{rect}$ is the rectification matrix of the camera, and $T_{velo\_to\_cam}$ is the projection matrix from the lidar to the camera.

Then the bilinear interpolation method is used to obtain the pointwise image feature representation, using the following formula:

$$V^{(P_i)} = K(F^{(N(\tilde{P}_i))}).$$

$V^{(P_i)}$ represents an image feature corresponding to $P_i$, K represents the bilinear interpolation function, and $F^{(N(\tilde{P}_i))}$ represents an image feature of a pixel adjacent to the projection position.

② The pointwise image feature, the point cloud feature, and the preprocessed point cloud data at the same scale are input into a gated weight generation network as shown in FIG. 5. Specifically, in the present disclosure, the preprocessed point cloud data $F_{oL}$ is input into three fully connected layers, the pointwise image feature $F_I$ and the point cloud feature $F_L$ are separately input into a fully connected layer, then three results with a same channel size are summed to generate two branches through a tanh function, and the two branches are compressed into single-channel weight matrices ($w_I$ and $w_L$) through two fully connected layers. The two weight matrices are normalized to a range of [0, 1] by using the sigmoid activation function, the two weight matrices are multiplied with the pointwise image feature and the point cloud feature respectively to generate a gated image feature $F_{g.I}$ and a gated lidar point cloud feature $F_{g.I}$ . . . . The formulas are as follows:

$$F_{g.I} = F_I \times \sigma(U\tanh(w_1 F_{oL} + w_2 F_I + w_3 F_L)).$$

$$F_{g.L} = F_L \times \sigma(V\tanh(w_1 F_{oL} + w_2 F_I + w_3 F_L)).$$

σ represents the sigmoid activation function, and U, V, and $w_i$ (i=1, 2, 3) represent learnable parameters in the fusion module.

③ The generated gated image feature $F_{g.I}$ and the gated lidar point cloud feature $F_{g.L}$ are input into the depth selection network as shown in FIG. 5. Specifically, the scale-corresponding point cloud data is divided into a short-distance point set and a long-distance point set according to the depth threshold generated by the adaptive threshold generation module. In the short-distance point set, the point cloud feature $F_L$ and the gated image feature $F_{g.I}$ are concatenated in a feature dimension; in the long-distance point set, the pointwise image feature $F_I$ and the gated lidar point cloud feature $F_{g.L}$ are concatenated in the feature dimension. In addition, to mitigate the impact of disordered point clouds on network performance, the present disclosure employs index connections for fusing multimodal features across point sets. The specific implementation of index connections involves storing indexes of the point cloud data in matrices, and traversing the index matrices to reconstruct the order of point clouds when concatenating the multimodal features across the point sets.

This dual stitching strategy, that is, concatenation for fusion within point sets and index connections for fusion across point sets, can be formulated as follows:

$$F_{fu} = C(F_{g.L}^{(pf)} \| F_I^{(pf)}, F_L^{(pn)} \| F_{g.I}^{(pn)}).$$

C(•) represents index connection, || represents concatenation, $p_f$ represents the long-distance point set, $p_n$ represents the short-distance point set, $F_{fu}$ represents the multimodal fusion features.

The depth selection network can output the multimodal fusion features $F_{fu}$ through the dual stitching strategy. It is noted that as shown in FIG. 3, the output of the first four fusion modules $F_{fu}$ based on the depth attention mechanism are sent back to scale-corresponding feature extraction layers in the lidar point cloud feature extraction module, and further encoded through a lidar feature extraction process. In the present disclosure, only the fusion features output by the last fusion module based on the depth attention mechanism are taken as the output of the whole multi-scale feature fusion backbone network for generating the 3D bounding box proposals.

As shown in the generation phase for 3D bounding box proposals in FIG. 2(*a*), the fusion features obtained through the multi-scale feature fusion backbone network are used for bin-based 3D bounding box generation, to generate the 3D bounding box proposals using the foreground points, and 512 3D bounding box proposals are selected as the output by using the NMS algorithm. Specifically, the multimodal fusion features $F_{fu}$ obtained through the multi-scale feature fusion backbone network are input into a one-dimensional convolution layer to generate classification scores for point clouds corresponding to the fusion features, and a point with a classification score greater than 0.2 is considered as a foreground point, otherwise, the point is considered as a background point, that is, a foreground mask is obtained. The target 3D bounding box proposals are generated using the foreground points through the bin-based 3D bounding box generation method, and 512 3D bounding box proposals are selected as the output by using the NMS algorithm. The method is similar to mature methods in the PointRCNN architecture, and details are not described herein. The 3D bounding box proposals can be expressed as (x, y, z, h, w, l, θ), (x, y, z) represent the coordinates of the target center, (h, w, l) represent the size of the target bounding box, and θ represents the yaw angle.

In step 2.2, the refinement phase for 3D bounding boxes in FIG. 2(*b*) includes: the 3D bounding box proposals, the fusion features, and foreground masks obtained in the step 2.1 are input into the refinement phase for 3D bounding boxes, refinement correction and classification confidence estimation are performed for the 3D bounding boxes, and the parameters and classification confidence are finally output for the target bounding box, to realize accurate and robust 3D target detection. The refinement phase for bounding boxes herein is the same as that in PointRCNN, and details are not described herein.

In step 3, the 3D target detection network based on multimodal fusion and the depth attention mechanism is trained. The network is jointly optimized through multiple losses. Specifically, since the present disclosure involves a two-phase architecture, a total loss is a sum of a loss $L_{rpn}$ in the generation phase for 3D bounding box proposals and a loss $L_{renn}$ in the refinement phase for 3D bounding boxes, and the loss setting is the same as that in the EPNet network.

$$L_{total}=L_{rpn}+L_{renn}.$$

Figure 7:
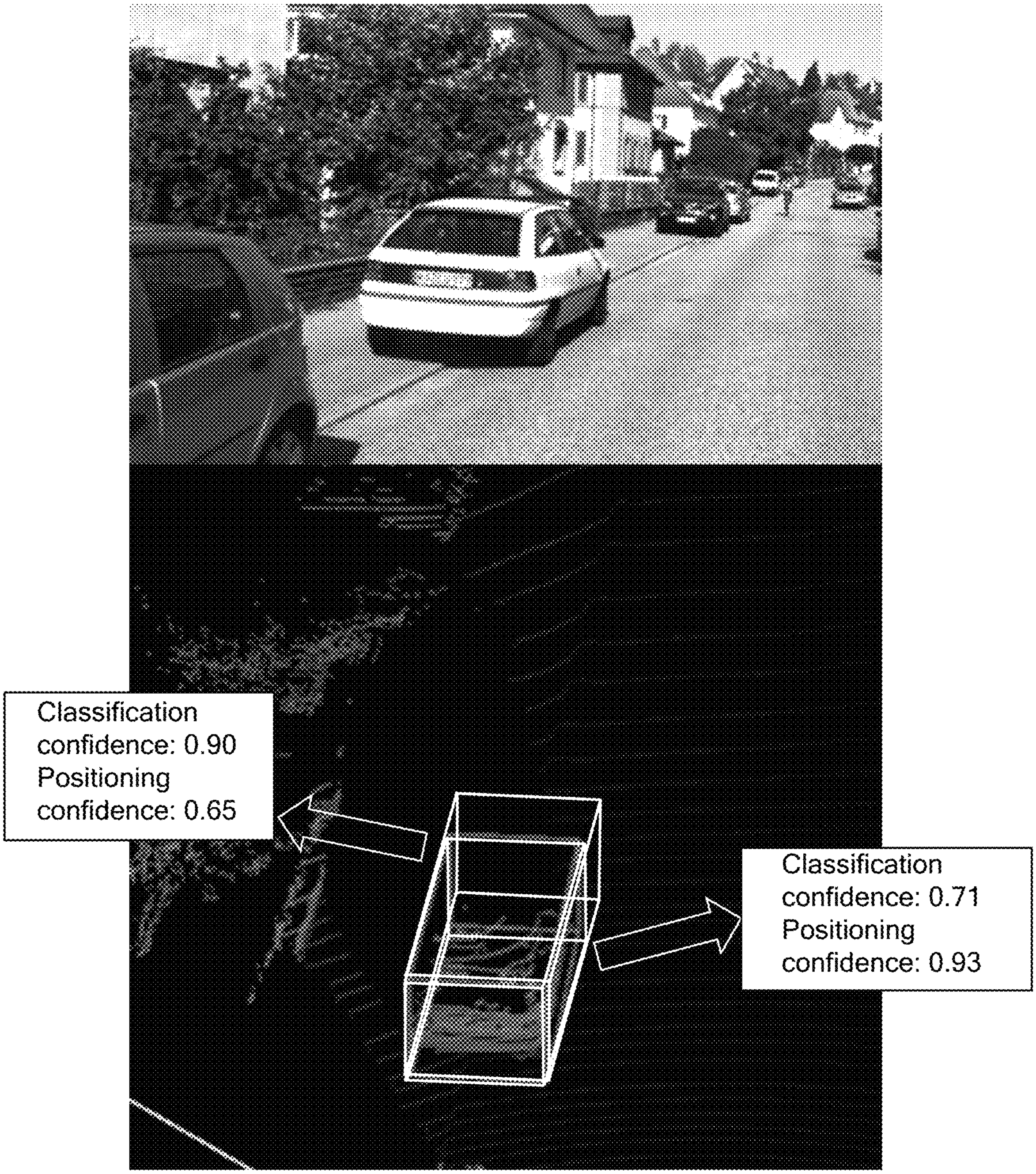
FIG. 7 is a schematic diagram showing inconsistent classification confidence and positioning confidence.

Both losses adopt similar optimization objectives. For example, considering the inconsistency between the positioning confidence and the classification confidence as shown in FIG. 7, the loss $L_{rpn}$ is constrained using the consistent enforcement loss $L_{ce}$. The losses also include classification losses and regression losses. Specifically, the bounding box size (h, w, l) and the Y axis are optimized using the smooth L1 loss, the bin-based regression loss is adopted for the X axis, Z axis, and θ direction. In addition, the focal loss is used as the classification loss to balance the mismatch between positive and negative samples, α=0.25 and γ=2.0.

$$L_{rpn} = L_{cls} + L_{reg} + \lambda L_{ce}.$$

$$C_{cls} = -\alpha(1-c_t)^{\gamma}\log(c_t).$$

$$L_{reg} = \sum_{u\in x,z,\theta} E(\hat{b}_u, b_u) + \sum_{u\in x,y,z,h,w,l,\theta} S(\hat{r}_u, r_u).$$

$$L_{ce} = -\log\left(c \times \frac{\text{Area}(D \cap G)}{\text{Area}(D \cup G)}\right).$$

E is the cross entropy loss, S is the smooth L1 loss, $c_t$ is the confidence score of the current point of the point cloud belonging to the foreground, $\hat{b}_u$, $b_u$ are respectively the predicted bin and the real bin, and $\hat{r}_u$, $r_u$ are the predicted residual shift and the real residual shift. D is the predicted 3D bounding box, G is the real 3D bounding box, and C is the classification confidence of D.

In step 4, the collected and to-be-detected lidar point cloud data and image data are processed by using the trained 3D target detection network based on multimodal fusion and the depth attention mechanism, and 3D target information including the parameters and classification confidence of the 3D target bounding box is output, to realize 3D target detection, and the processor controls drive motors of a vehicle based on the 3D target information.

The processor controls the drive motors of the vehicle based on the 3D target information including:

The processor of the vehicle carries out vehicle path planning based on the 3D target information, and then controls the drive motors of the vehicle based on the planned path, thereby controlling the movement of the vehicle, realizing safe driving of the self-driving vehicle, and improving the safety of the self-driving.

Experimental Verification

Figure 8:
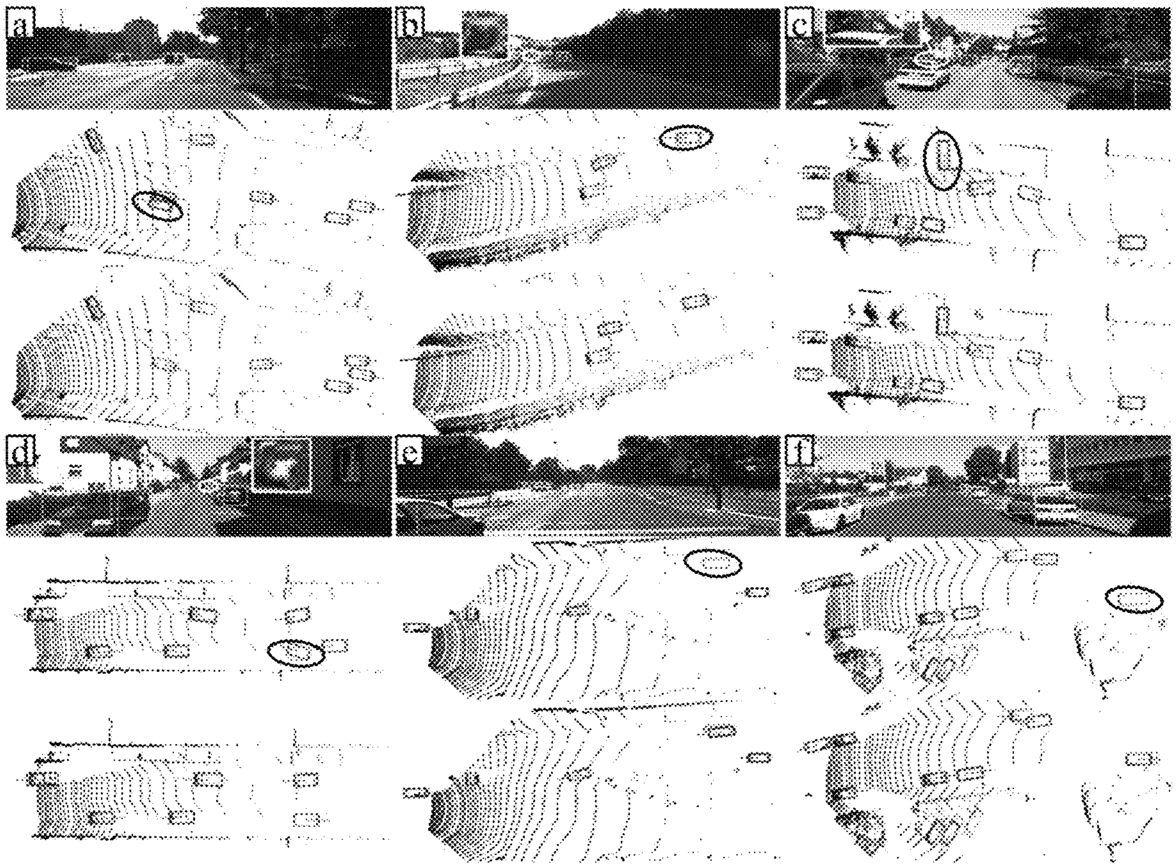
FIG. 8 is a diagram of 3D target detection results of a fusion network based on multimodal fusion and a depth attention mechanism.

In order to verify the feasibility and effectiveness of the present disclosure, the standard benchmark KITTI dataset for autonomous driving is used for testing, including 7481 training samples and 7518 test samples. The 7481 training samples are further divided into 3712 samples for the training set and 3769 samples for the validation set. Pre-experiment data preprocessing involves rotation, flipping, and scaling transformations, with three common data augmentation strategies employed to prevent overfitting. FIG. 8 is a comparison diagram of qualitative results between the method of the present disclosure and other 3D detectors. Details are described as follows:

FIG. 8 shows the qualitative comparison results between the present disclosure and other 3D detectors. At the top is the 3D bounding box displayed on the image, in the middle is the detection result from another 3D detector, and at the bottom is the detection result from the present disclosure. It can be observed that the present disclosure effectively corrects the orientation of the target bounding box, particularly for distant targets. Specifically, as shown in a of FIG. 8, unlike other methods, the present disclosure shows no false positives. Sparse lidar points cannot effectively represent target structure information, resulting in indistinct foreground-background differentiation and increased likelihood of false positives. According to the present disclosure, dividing the point cloud enables the network to prioritize features effectively. Even with interference in the point cloud features and lacking color texture information of the target, the present disclosure achieves error-free detection. In addition, in c of FIG. 8 and d of FIG. 8, other networks have misjudged the orientation of the bounding box (given by the short line under the bounding box), in contrast, the present disclosure realizes correct detection. Finally, e of FIG. 8 and f of FIG. 8 demonstrate the excellent performance of the present disclosure in detecting distant objects, attributed to the optimal balance between image semantic features and point cloud geometric features. In summary, the present disclosure leverages image data and lidar sensor point cloud data of the camera sensor to extract multi-scale cross-modal heterogeneous features. This enables comprehensive and effective fusion of heterogeneous features, achieving precise and robust 3D target detection.

The above embodiments are intended to explain the present disclosure, rather than to limit the present disclosure. Any modifications and changes made to the present disclosure within the spirit and the protection scope defined by the claims should all fall within the protection scope of the present disclosure.

Figure 9:
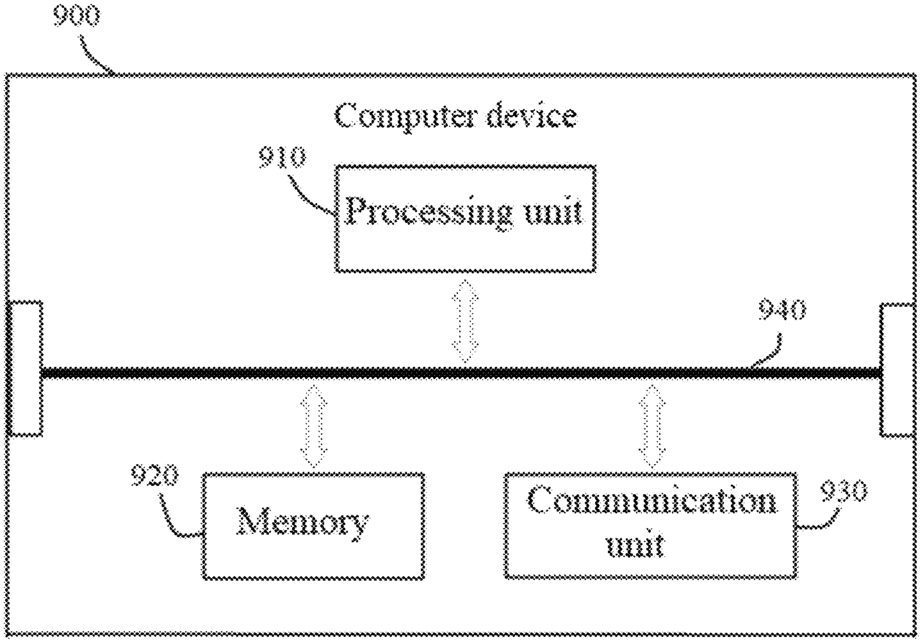
FIG. 9 illustrates a schematic diagram of a computer device according to embodiments.

FIG. 9 illustrates a schematic diagram of a computer device 900 according to embodiments. Specifically, FIG. 9 illustrates a schematic diagram of a computer device 900 configured to run the 3D target detection method based on multimodal fusion and a depth attention mechanism of the present application. The computer device 900 may, for example, be an in-vehicle computing terminal, and the vehicle may realize the acquisition of the original point cloud data and original image data by the computer device 900.

As shown in FIG. 9, the computer device 900 includes a processor (processing unit) 910, a memory 920, and a communication unit 330. The processor 910, memory 920, and communication unit 930 may be connected via a bus system 940. The memory 920 is configured to store programs, instructions, or code, such as programs, instructions, or code corresponding to the 3D target detection method based on multimodal fusion and a depth attention mechanism.

The processor 910 is configured to execute programs, instructions, or code stored in memory 920 in order to accomplish the operation of the various steps discussed herein. For example, the steps and operations discussed herein may be executed or implemented by the processor 910 via the communication unit 930. The communication unit 930 may be a transceiver or other suitable interface to implement the relevant operations discussed herein. The processor 910, via the communication unit 930, may realize the acquisition of the original point cloud data and original image data, and realize a preprocess of the original point cloud data and original image data by running stored programs, instructions, or code in the memory 920. For example, the processor 910 controls drive motors of a vehicle based on the output 3D target information.

For example, the processor 910 may include one or more central processing units (CPUs) or general-purpose processors with one or more processing cores, although other types of processors may also be used.

In some embodiments, the memory 920 is further configured to store the original point cloud data and original image data, as well as to store data such as preprocessed point cloud data and image data.

Persons skilled in the art will understand that the structures and methods specifically described herein and shown in the accompanying figures are non-limiting exemplary aspects, and that the description, disclosure, and figures should be construed merely as exemplary of aspects. It is to be understood, therefore, that the present disclosure is not limited to the precise aspects described, and that various other changes and modifications may be effected by one skilled in the art without departing from the scope or spirit of the disclosure. Additionally, the elements and features shown or described in connection with certain aspects may be combined with the elements and features of certain other aspects without departing from the scope of the present disclosure, and that such modifications and variations are also included within the scope of the present disclosure. Accordingly, the subject matter of the present disclosure is not limited by what has been particularly shown and described.

What is claimed is:

1. A three-dimensional (3D) target detection method based on multimodal fusion and a depth attention mechanism, comprising:

step 1: obtaining original point cloud data and original image data, wherein the original point cloud data comprises spatial coordinate information (x, y, z) and the original image data comprises red, green, blue (RGB) information; and then preprocessing the obtained original point cloud data and original image data to obtain preprocessed point cloud data and image data;

step 2: inputting the preprocessed point cloud data and image data into a 3D target detection network based on multimodal fusion and the depth attention mechanism, wherein the 3D target detection network based on multimodal fusion and the depth attention mechanism comprises two phases: the first is a generation phase for 3D bounding box proposals and the second is a refinement phase for 3D bounding boxes, and the 3D target detection network finally outputs parameters and classification confidence of a target bounding box, wherein step 2.1: the generation phase for 3D bounding box proposals, specifically comprising:

inputting the preprocessed point cloud data and image data into the generation phase for 3D bounding box proposals, wherein in said phase, the input data is first input into a multi-scale feature fusion backbone network for multimodal feature fusion, to output fusion features; then the fusion features are used for bin-based 3D bounding box generation, to generate the 3D bounding box proposals using foreground points, and a plurality of 3D bounding box proposals are selected as output by using a non-maximum suppression (NMS) algorithm;

the multi-scale feature fusion backbone network comprises four submodules: a lidar point cloud feature extraction module, an image feature extraction module, an adaptive threshold generation module, and fusion modules based on the depth attention mechanism;

a data flow direction in the multi-scale feature fusion backbone network is as follows: the preprocessed point cloud data is input into the lidar point cloud feature extraction module to output point cloud features at five different scales; simultaneously, the preprocessed point cloud data is input into the adaptive threshold generation module to output a depth threshold; the preprocessed image data is input into the image feature extraction module to output image features at five different scales; a fusion module based on the depth attention mechanism is built between point cloud features and image features at a consistent scale, to perform multimodal feature fusion, and there are five scale-corresponding fusion modules based on the depth attention mechanism; input of each fusion module based on the depth attention mechanism comprises the point cloud features and image features at the same scale obtained through the lidar point cloud feature extraction module and the image feature extraction module, the preprocessed point cloud data, and the depth threshold obtained through the adaptive threshold generation module, and output of each fusion module is multimodal fusion features;

the output of the first four fusion modules based on the depth attention mechanism is sent back to scale-corresponding feature extraction layers in the lidar point cloud feature extraction module, and further encoded through a lidar feature extraction process, and the fusion features output by the last fusion module based on the depth attention mechanism are taken as output of the whole multi-scale feature fusion backbone network; and the fusion features obtained through the multi-scale feature fusion backbone network are used for bin-based 3D bounding box generation, to generate the 3D bounding box proposals using the foreground points, and the plurality of 3D bounding box proposals are selected as the output; and step 2.2: the refinement phase for 3D bounding boxes, comprising: inputting the 3D bounding box proposals, the fusion features, and foreground points obtained in the step 2.1 into the refinement phase for 3D bounding boxes, performing refinement correction and classification confidence estimation for the 3D bounding boxes, and finally outputting the parameters and classification confidence for the target bounding box;

step 3: training the 3D target detection network based on multimodal fusion and the depth attention mechanism; and step 4: processing the collected and to-be-detected lidar point cloud data and image data by using the trained 3D target detection network based on multimodal fusion and the depth attention mechanism, and outputting 3D target information comprising the parameters and classification confidence of the 3D target bounding box, to realize 3D target detection.

2. The 3D target detection method based on multimodal fusion and a depth attention mechanism according to claim 1, wherein in the step 1, the original point cloud data and the original image data are obtained from a KITTI data set.

3. The 3D target detection method based on multimodal fusion and a depth attention mechanism according to claim 1, wherein in the step 2.1, the input of the lidar point cloud feature extraction module is the preprocessed lidar point cloud data, and the point cloud features at different scales are output, wherein specifically, four set abstraction (SA) layers are built for down-sampling of the point cloud features, and then four feature propagation (FP) layers are used for up-sampling of the point cloud features.

4. The 3D target detection method based on multimodal fusion and a depth attention mechanism according to claim 1, wherein in the step 2.1, the input of the image feature extraction module is the preprocessed image data, and the image features at different scales are output, wherein specifically, four convolution blocks are built to match resolutions of the point cloud features, each convolution block comprises a batch normalization (BN) layer, a rectified linear unit (ReLU) activation function, and two convolution layers, and a stride of the second convolution layer is set to 2 for down-sampling of the image features, and transposed convolution is used for up-sampling of the image features with four different resolutions.

5. The 3D target detection method based on multimodal fusion and a depth attention mechanism according to claim 1, wherein in the step 2.1, the adaptive threshold generation module treats each point of the preprocessed lidar point cloud data as a center point to calculate a density, comprising: first dividing the preprocessed point cloud data into spherical neighborhoods with the center point as a centroid, then calculating a quantity of point clouds within each neighborhood, and dividing the quantity by a neighborhood volume, to obtain volume densities of different regions of the point cloud, encoding the density information through a multi-layer perceptron (MLP), normalizing output of the MLP to a range of [0, 1] using a sigmoid activation function, and finally outputting the depth threshold.

6. The 3D target detection method based on multimodal fusion and a depth attention mechanism according to claim 1, wherein in the step 2.1, the fusion module based on the depth attention mechanism specifically performs the following steps:

generating pointwise image feature representations by using the preprocessed point cloud data and the scale-corresponding image features obtained through the image feature extraction module;

inputting the pointwise image feature, the point cloud feature, and the preprocessed point cloud data at the same scale into a gated weight generation network, comprising: inputting the preprocessed point cloud data $F_{oL}$ into three fully connected layers, separately inputting the pointwise image feature $F_I$ and the point cloud feature $F_L$ into a fully connected layer, then adding three results with a same channel size to generate two branches through a tanh function, compressing the two branches into single-channel weight matrices through two fully connected layers; normalizing the two weight matrices to a range of [0, 1] by using the sigmoid activation function, multiplying the two weight matrices with the pointwise image feature and the point cloud feature respectively to generate a gated image feature $F_{g.I}$ and a gated lidar point cloud feature $F_{g.L}$; and inputting the generated gated image feature $F_{g.I}$ and gated lidar point cloud feature $F_{g.L}$ into a depth selection network, comprising: dividing the scale-corresponding point cloud data into a short-distance point set and a long-distance point set according to the depth threshold generated by the adaptive threshold generation module; in the short-distance point set, concatenating the point cloud feature $F_L$ and the gated image feature $F_{g.I}$ in a feature dimension; in the long-distance point set, concatenating the pointwise image feature $F_I$ and the gated lidar point cloud feature $F_{g.L}$ in the feature dimension; and fusing multimodal features across the point sets through index connections, wherein the depth selection network finally outputs the multimodal fusion features.

7. The 3D target detection method based on multimodal fusion and a depth attention mechanism according to claim 1, wherein in the step 2.1, the fusion features obtained through the multi-scale feature fusion backbone network are used for bin-based 3D bounding box generation, to generate the 3D bounding box proposals using the foreground points, and the plurality of 3D bounding box proposals are selected as the output, specifically comprising:

inputting the multimodal fusion features $F_{fu}$ obtained through the multi-scale feature fusion backbone network into a one-dimensional convolution layer to generate classification scores for point clouds corresponding to the fusion features, and a point with a classification score greater than 0.2 is considered as a foreground point, otherwise, the point is considered as a background point, that is, a foreground mask is obtained; then generating the target 3D bounding box proposals using the foreground points through the bin-based 3D bounding box generation method, and selecting 512 3D bounding box proposals as the output by using the NMS algorithm.

8. The 3D target detection method based on multimodal fusion and a depth attention mechanism according to claim 1, wherein in the step 3, a total loss is a sum of a loss $L_{rpn}$ in the generation phase for 3D bounding box proposals and a loss $L_{renn}$ in the refinement phase for 3D bounding boxes.

* * * * *